(12) United States Patent
Winzell

(10) Patent No.: US 11,568,186 B2
(45) Date of Patent: Jan. 31, 2023

(54) DISTINGUISHING—IN AN IMAGE—HUMAN BEINGS IN A CROWD

(71) Applicant: Axis AB, Lund (SE)

(72) Inventor: Thomas Winzell, Lund (SE)

(73) Assignee: AXIS AB, Lund (SE)

( * ) Notice: Subject to any disclaimer, the term of this patent is extended or adjusted under 35 U.S.C. 154(b) by 86 days.

(21) Appl. No.: 17/143,185

(22) Filed: Jan. 7, 2021

(65) Prior Publication Data

US 2021/0224615 A1 Jul. 22, 2021

(30) Foreign Application Priority Data

Jan. 21, 2020 (EP) .................................... 20152781

(51) Int. Cl.
*G06K 9/62* (2022.01)
*G06V 20/10* (2022.01)
*G06V 20/52* (2022.01)

(52) U.S. Cl.
CPC ........... *G06K 9/6284* (2013.01); *G06V 20/10* (2022.01); *G06V 20/53* (2022.01)

(58) Field of Classification Search
CPC .... G06K 9/6284; G06K 9/6267; G06V 20/10; G06V 20/53; G06V 10/143; G06V 20/52; G06V 40/103; G06V 40/10; G06T 7/0002
(Continued)

(56) References Cited

U.S. PATENT DOCUMENTS

2016/0283798 A1* 9/2016 Goldner .................. G06V 10/50
2019/0387185 A1* 12/2019 Hicks ....................... H04N 5/33

FOREIGN PATENT DOCUMENTS

WO   WO-2020153971 A * 7/2020 ......... G06K 9/00248

OTHER PUBLICATIONS

Bertozzi et al., "Infrared Stereo Vision-based Pedestrian Detection", IEEE, Intelligent Vehicles Symposium, XP010833937, Jun. 6, 2005, pp. 24-29.

(Continued)

*Primary Examiner* — Ayodeji O Ayotunde
(74) *Attorney, Agent, or Firm* — Xsensus LLP

(57) ABSTRACT

The present disclosure relates to a method performed by a people distinguishing system (1) for in an image distinguishing human beings in a crowd. The people distinguishing system identifies (1001) one or more detected objects classified as human beings (2) in an image (3) derived from a thermal camera (10) adapted to capture a scene in an essentially forward-looking angle. The people distinguishing system further identifies at least a first grouping (4) of adjoining pixels in the image, not comprised in the one or more detected human beings, having an intensity within a predeterminable intensity range. Moreover, the people distinguishing system determines (1003) a grouping pixel area (40) of the at least first grouping in the image. Furthermore, the people distinguishing system determines (1004) for at least a first vertical position ($y_{expected}$) in the image, based on head size reference data (5), an expected pixel area ($x_{expected}$) of a human head at the at least first vertical position. The people distinguishing system further compares (1005) at least a portion of the grouping pixel area with the expected head pixel area for the at least first vertical position. Moreover, the people distinguishing system determines (1006) that the at least first grouping comprises at least a first overlapping human being (6), when at least a first comparison resulting from the comparing exceeds a predeterminable conformity threshold.

The disclosure also relates to a people distinguishing system in accordance with the foregoing, a thermal camera comprising such people distinguishing system, and a respective (Continued)

corresponding computer program product and non-volatile computer readable storage medium.

16 Claims, 4 Drawing Sheets

(58) Field of Classification Search
USPC .......................................................... 382/103
See application file for complete search history.

(56) References Cited

OTHER PUBLICATIONS

Pham et al., "Real-Time Posture Analysis in a Crowd using Thermal Imaging", IEEE Conference on Computer Vision and Pattern Recognition, XP032392172, Jun. 17, 2007, 8 pages.

* cited by examiner

DISTINGUISHING—IN AN IMAGE—HUMAN BEINGS IN A CROWD

CROSS REFERENCE TO RELATED APPLICATION

The present application is based on and claims priority of European Patent Application No. 20152781.9 filed on Jan. 21, 2020, the entire contents of which are incorporated herein by reference.

TECHNICAL FIELD

The present disclosure relates to in an image distinguishing human beings in a crowd.

BACKGROUND

For various reasons, there may be a need for and/or an interest in attempting to count people appearing in an image. The image may be of any arbitrary scene of which a camera—such as a surveillance camera—has captured the image, for instance of people in a room, in an open area and/or in an open space.

Computer vision techniques, for instance, may provide estimates of number of people in an image. A moving window-like detector may be used to identify people in the image and count how many people there are, which may require well trained classifiers for detection that can extract low-level features. However, although these techniques may work well for detecting faces, they commonly do not perform well on crowded images where some of the target objects—here the human beings—not are clearly visible.

SUMMARY OF THE INVENTION

It is therefore an object of embodiments herein to provide an approach for in an improved and/or alternative manner distinguishing—in an image—people in a crowd.

The object above may be achieved by the subject-matter disclosed herein. Embodiments are set forth in the appended claims, in the following description and in the drawings.

The disclosed subject-matter relates to a method performed by a people distinguishing system for in an image distinguishing human beings in a crowd. The people distinguishing system identifies one or more detected objects classified as human beings in an image derived from a thermal camera adapted to capture a scene in an essentially forward-looking angle. The people distinguishing system further identifies at least a first grouping of adjoining pixels in the image, not comprised in the one or more detected human beings, having an intensity within a predeterminable intensity range. Moreover, the people distinguishing system determines a grouping pixel area of the at least first grouping in the image. Furthermore, the people distinguishing system determines—for at least a first vertical position in the image—based on head size reference data, an expected pixel area of a human head at the at least first vertical position. The people distinguishing system further compares at least a portion of the grouping pixel area with the expected head pixel area for the at least first vertical position. Moreover, the people distinguishing system determines that the at least first grouping comprises at least a first human being, when at least a first comparison resulting from said comparing exceeds a predeterminable conformity threshold.

The disclosed subject-matter further relates to a people distinguishing system for in an image distinguishing human beings in a crowd. The people distinguishing system comprises a human identifying unit for—and/or adapted for—identifying one or more detected objects classified as human beings in an image derived from a thermal camera adapted to capture a scene in an essentially forward-looking angle. The people distinguishing system further relates to a grouping identifying unit for—and/or adapted for—identifying at least a first grouping of adjoining pixels in the image, not comprised in the one or more detected human beings, having an intensity within an predeterminable intensity range. Moreover, the people distinguishing system comprises an area determining unit for—and/or adapted for—determining a grouping pixel area of a human head at the at least first vertical position. The people distinguishing system further comprises an expected area determining unit for—and/or adapted for—determining for at least a first vertical position in the image, based on head size reference data, an expected pixel area of a human head at the at least first vertical position. Furthermore, the people distinguishing system comprises a comparing unit for—and/or adapted for—comparing at least a portion of the grouping pixel area with the expected head pixel area for the at least first vertical position. The people distinguishing system moreover comprises a conformity determining unit for—and/or adapted for—determining that the at least first grouping comprises at least a first human being when at least a first comparison resulting from the comparing exceeds a predeterminable conformity threshold.

Furthermore, the disclosed subject-matter relates to a thermal camera comprising a people distinguishing system as described herein.

Moreover, the disclosed subject-matter relates to a computer program product comprising a computer program containing computer program code means arranged to cause a computer or a processor to execute the steps of the people distinguishing system described herein, stored on a computer-readable medium or a carrier wave.

The disclosed subject-matter further relates to a non-volatile computer readable storage medium having stored thereon said computer program product.

Thereby, there is introduced an approach enabling distinguishing one person from another in a people-crowded image. That is, since there is identified one or more detected objects classified as human beings in an image derived from a thermal camera adapted to capture a scene in an essentially forward-looking angle, objects detected in the thermal camera image and classified as humans may be acknowledged. The use of a thermal camera further enables potential issues with light conditions such as shadows, backlight, darkness, camouflaged objects etc. to be mitigated. Moreover, that is, since there is identified at least a first grouping of adjoining pixels in the image having an intensity within an predeterminable intensity range, not comprised in the one or more detected human beings, areas of adjacent pixels in the image—excluding the already detected human beings—having a specific intensity such as an intensity corresponding to a human, may be acknowledged, thus indicating that people may be present in the at least first grouping. Furthermore, that is, since a grouping pixel area of the at least first grouping in the image is determined, there is established an area distribution of the adjoining pixels identified to be within the predeterminable range. Moreover, that is, since there is determined for at least a first vertical position in the image, based on head size reference data, an expected pixel area of a human head at the at least first vertical position, by confronting head size reference data, there is established respective expected pixel area form and size of a human head for one or more vertical positons in the image. That is, an exemplifying low value vertical position may be indicative of nearness to the thermal camera as compared to an exemplifying higher value vertical positon, whereby a pixel area of a human head at the exemplifying low value vertical position may be expected to be of greater size than for the exemplifying higher value vertical position. Accordingly, the head size reference data comprises a mapping between one or more vertical positions and corresponding expected size and form of a human head in terms of expected pixel area for respective one or more vertical positions, thus enabling for determining a respective expected head size at a respective vertical position. Furthermore, that is, since at least a portion of the grouping pixel area is compared with the expected head pixel area for the at least first vertical position, selected regions of pixels of the grouping pixel area are compared with respective expected pixel area(s) of human heads for one or more vertical positions. Moreover, that is, since it is determined that the at least first grouping comprises at least a first overlapping human being when at least a first comparison resulting from said comparing exceeds a predeterminable conformity threshold, it may be established, provided that the comparing activities lead to one or more exceedances of a threshold setting a level for minimum conformity between a region of the grouping pixel area—such as a region at least partly resembling a human head—and an expected head size, that the at least first grouping in the image comprises one or more overlapping human beings. Accordingly, people not distinguishable in a crowded image by means of e.g. commonly known object detection—and/or with difficulty distinguishable—may be distinguishable with the introduced concept.

For that reason, an approach is provided for in an improved and/or alternative manner distinguishing—in an image—people in a crowd.

The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
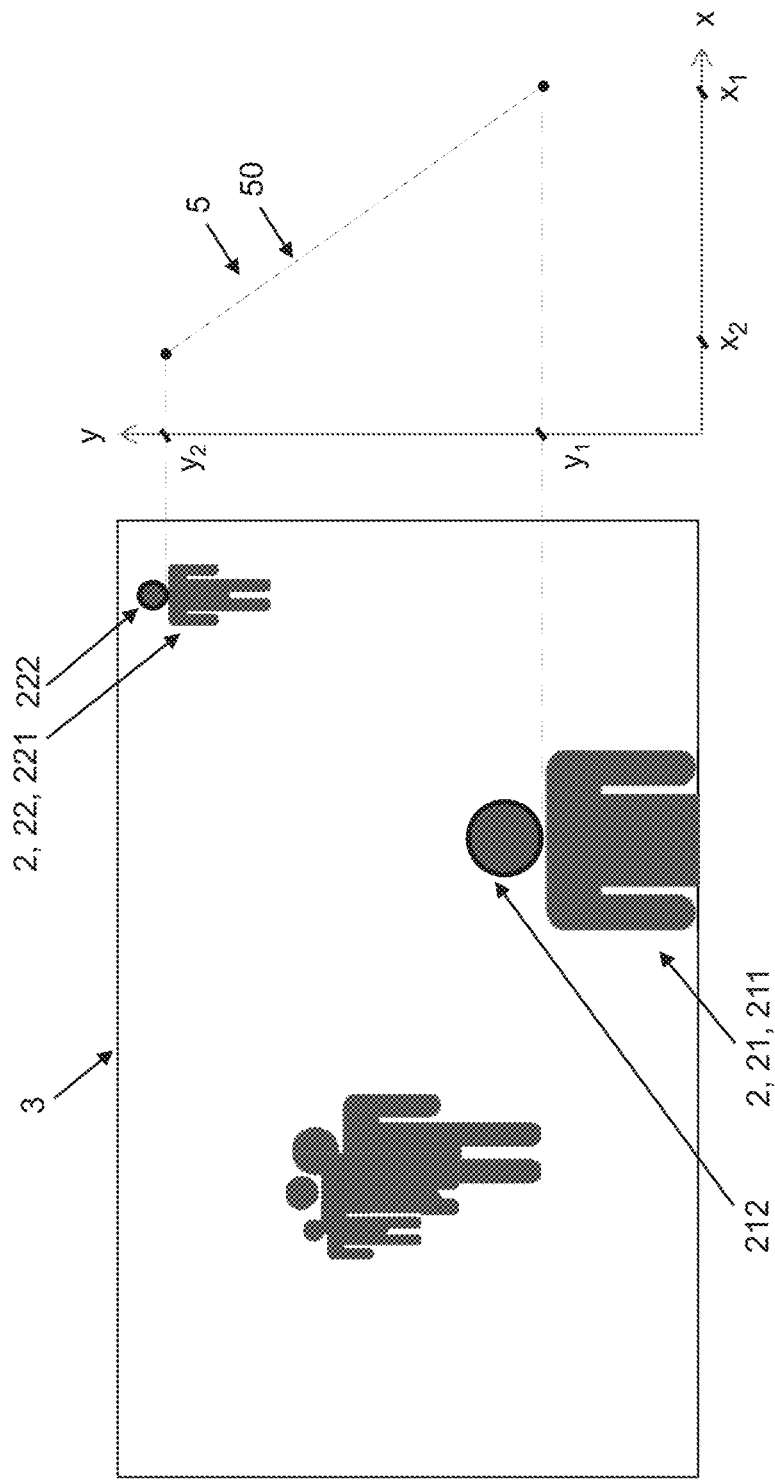
FIGS. 1-2 illustrate schematic views relating to an exemplifying people distinguishing system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to in an image distinguishing human beings in a crowd, there will be disclosed an approach enabling distinguishing one person from another in a people-crowded image.

Figure 2:
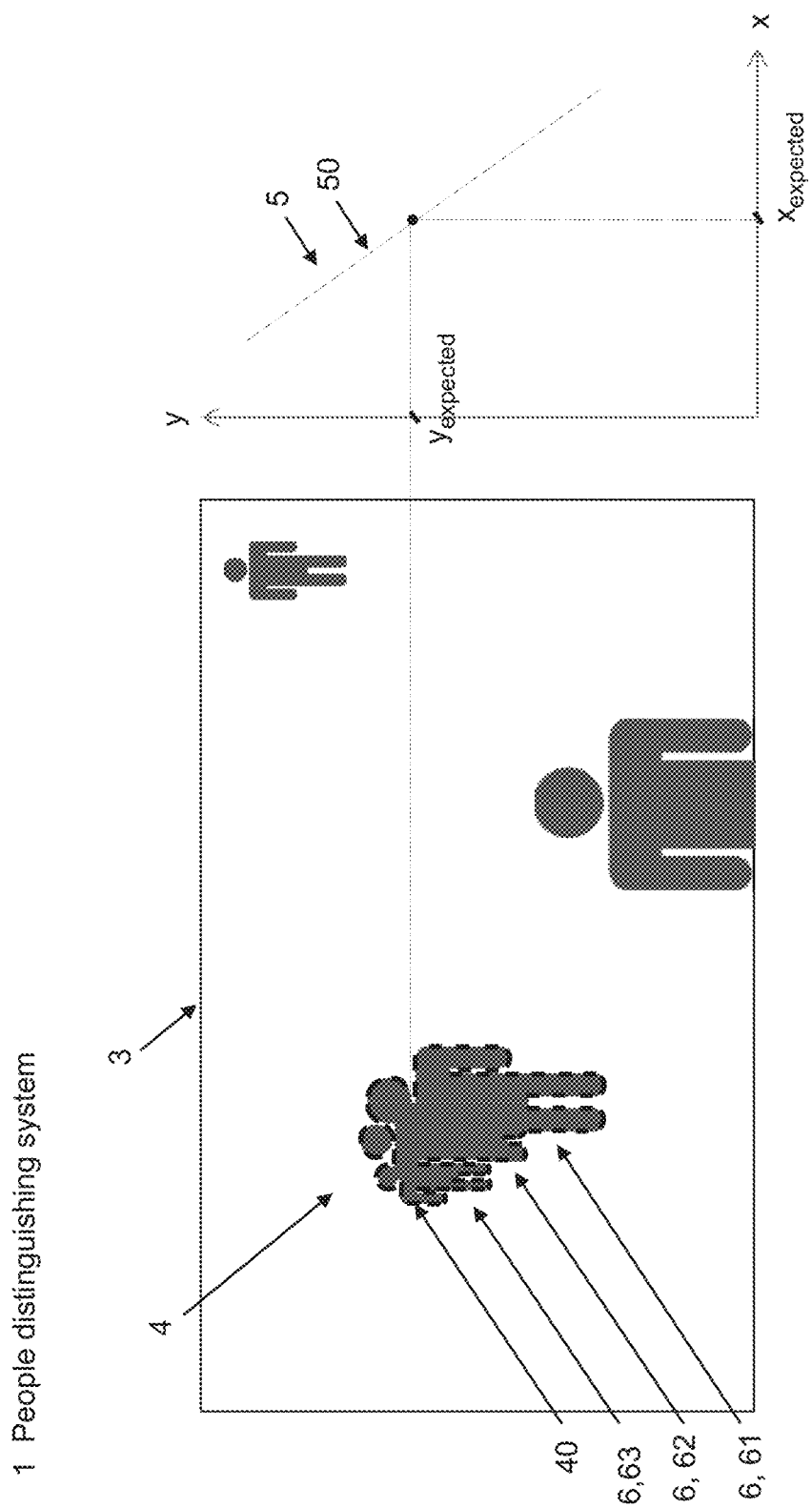

Referring now to the figures and FIGS. 1-2 in particular, there are depicted schematic views relating to an exemplifying people distinguishing system 1 according to embodiments of the disclosure. The people distinguishing system 1 is adapted and/or configured for distinguishing—in an image—human beings in a crowd.

"People distinguishing system" may refer to "people detection system", "unique heads determining system" and/or merely "assessment system" or "control system", whereas the phrase "for in an image distinguishing human beings in a crowd" may refer to "for in an image distinguishing unique human beings or human heads in a crowd", "for in an image 30 distinguishing close together and/or at least partly overlapping people", "for in an image distinguishing one person from another person at least partly overlapping said one person" and/or "for distinguishing people in a crowded image". The term "crowd", on the other hand, may refer to "crowd of people".

Figure 3:
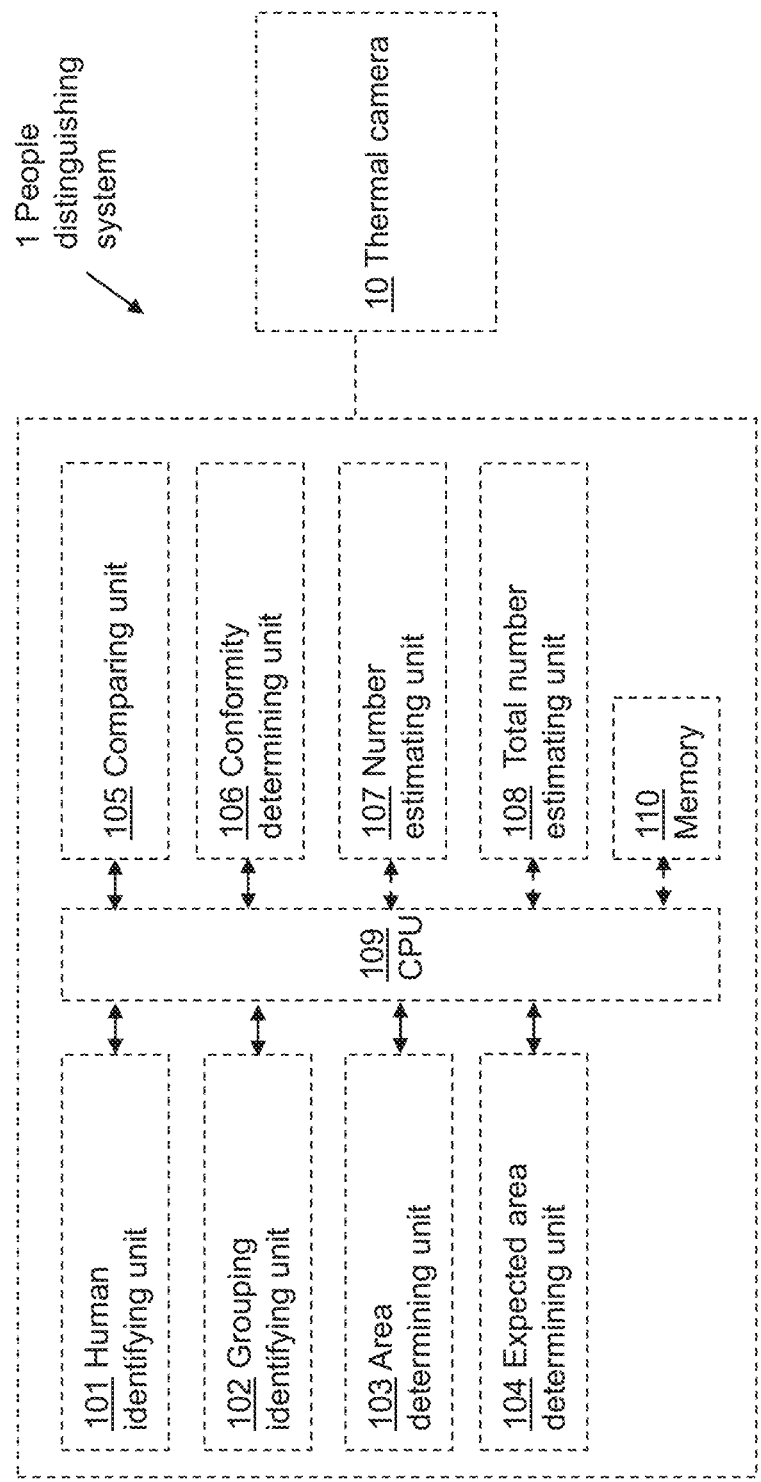
FIG. 3 is a schematic block diagram illustrating an exemplifying people distinguishing system according to embodiments of the disclosure.

The people distinguishing system 1 may be associated with—and optionally be comprised in—a thermal camera 10 (shown in FIG. 3). Thereby, with the use of a thermal camera 10, potential issues with light conditions such as shadows, backlight, darkness, camouflaged objects etc., may be mitigated.

The thermal camera 10 may refer to any arbitrary—e.g. known—thermal camera supporting creating images based at least in part on the heat constantly radiating from all objects, including people. The thermal camera 10—which may be considered a combined visual light and infrared, IR, camera—may further refer to any arbitrary camera supporting creating images using IR radiation in combination with visual light, i.e. which is sensitive to at least a portion of the IR range—such as the Medium Wavelength Infrared, MWIR, and/or the Long Wavelength Infrared, LWIR, bands—in combination with being sensitive to at least a portion of the visual light range.

The thermal camera 10 may according to an example be comprised in a thermal camera arrangement (not shown) comprising additional components, for instance being part of an exemplifying surveillance system (not shown). Thus, according to an example, the phrase "thermal camera comprising a people distinguishing system" may refer to "thermal camera arrangement comprising a people distinguishing system" and/or "thermal camera of a surveillance system, comprising a people distinguishing system".

The people distinguishing system 1 is—e.g. by means of a human identifying unit 101 (shown and further described in FIG. 3)—adapted and/or configured for identifying one or more detected objects 2 classified as human beings in an image 3 derived from a thermal camera 10 adapted to capture a scene in an essentially forward-looking angle. Thereby, objects detected in the thermal camera image 3 and classified as humans 2 may be acknowledged. In exemplifying FIG. 1, a first detected human being 21 and a second detected human being 22 are identified in an exemplifying manner.

The objects detected and classified as human beings 2 may be—or may have been—detected and classified in any arbitrary—e.g. known—manner, such as with support from commonly known computer vision techniques, image processing, object detection and/or classifiers, e.g. using a trained Histogram-of-Gradients, HoGs, algorithm. Number of detected objects classified as human beings 2 may naturally vary with the image 3 at hand, and may range up to tens, hundreds or even thousands of human beings 2. It may be noted, however, that the situation may occur where none detected objects classified as human beings 2 are identifiable and/or identified in the image 3, why the detected objects classified as human beings 2 may be considered "potential" detected objects classified as human beings 2. The term "image", on the other hand, may refer to any arbitrary camera-captured image, of any arbitrary size—e.g. in form of pixels—and/or of any arbitrary image quality.

The essentially forward-looking angle in which the thermal camera 10 is adapted and/or configured to capture a scene, may be represented by any arbitrary position of the thermal camera 10 in which said thermal camera 19 may capture potential people in said scene from essentially a side view and/or from a slight downward inclination, as opposed to e.g. a top view. The essentially forward-looking angle may accordingly be represented by the thermal camera 10 capturing the scene essentially in what may be considered eye level of people and/or from slightly there above, for instance indicating a position of the thermal camera 10 ranging from less than a metre up to several metres from the ground and/or floor. According to an example, the phrase "forward-looking angle" may refer to "slightly above forward-looking angle", thus indicating that the thermal camera 10 may be adapted to capture the scene—and subsequently potential people thereof—from a slightly downward inclination and/or tilting e.g. ranging from above zero up to 45 degrees. The scene, on the other hand, may be represented by any arbitrary surrounding, such as for instance a room, an open area, an open space, etc.

The phrase "identifying one or more detected objects classified as human beings" may refer to "acknowledging, sorting out, filtering out, blocking and/or blacklisting one or more detected objects classified as human beings". According to an example, said phrase may further refer to "counting one or more detected objects classified as human beings" and/or "classifying one or more detected objects as human beings". "Detected objects", on the other hand, may refer to "potential detected objects" and/or merely "objects", whereas "image" may refer to "camera image", "thermal camera image", "combined temperature and visual light image" and/or "image frame". The phrase "image derived from a thermal camera" may refer to "image obtained and/or fetched from a thermal camera" and/or merely "image from and/or captured by a thermal camera". "In an essentially forward—looking angle", on the other hand, may refer to "in essentially human eye level and/or at a slight downward inclination" and/or merely "in a forward-looking angle and/or at a slight downward inclination". Moreover, "scene" may refer to "surrounding", whereas "thermal camera adapted to capture a scene" may refer to "thermal camera adapted to capture an image of a scene". According to an example, the phrase "in an image derived from a thermal camera adapted to capture a scene in an essentially forward-looking angle" may refer to "in an image of a scene in an essentially forward-looking angle derived from a thermal camera".

As further illustrated in FIG. 2, the people distinguishing system 1 is—e.g. by means of a grouping identifying unit 102 (shown and further described in FIG. 3)—adapted and/or configured for identifying at least a first grouping 4 of adjoining pixels in the image 3, not comprised in the one or more detected human beings 2, having an intensity within an predeterminable intensity range. Thereby—excluding the already detected human beings 2—areas of adjacent pixels 4 in the image 3 of a specific intensity, such as an intensity corresponding to a human, may be acknowledged, thus indicating that people may be present in the at least first grouping 4. In exemplifying FIG. 1, merely a first grouping 4 is identified in an exemplifying manner. It may be noted, however, that in other exemplifying images (not shown), further separate groupings of adjoining pixels may naturally be identified and/or identifiable.

Identifying the at least first grouping 4 of adjoining pixels may be accomplished in any arbitrary—e.g. known—manner, such as with support from computer vision techniques and/or image processing. That is, since relative differences in intensities of the infrared energy being reflected or omitted from different objects may be detected and displayed in the image 3, a predetermined intensity range—such as comprising intensities corresponding to those of a human and/or human head—may be identified. The intensity range may refer to any range that may be representative of intensities and/or heat signatures of human beings and/or human heads. Moreover, the intensity range may for instance be pre-stored, such as in the people distinguishing system 1, in the thermal camera 10, on a remote server etc.

Optionally, however, the intensity range may be based on an intensity measure 211, 221 of at least one of the one or more detected human beings 2, such as in exemplifying FIG. 1, the exemplifying first detected human being 21 and the second detected human being 22. Thereby, an intensity or intensities of one or more already detected human beings 2 may form basis for defining the intensity range, such as the intensity range being essentially equal to—and or ranging around—said intensity measure(s) 221, 221 and/or a statistical intensity measure thereof. "Being based on an intensity measure" may refer to "being derived from an intensity measure", "being based on a statistical intensity measure" and/or "being based on an intensity value".

The phrase "identifying at least a first grouping of adjoining pixels" may refer to "identifying at least a first grouping of essentially adjoining pixels" and/or "acknowledging, selecting, sorting out and/or filtering out at least a first grouping of adjoining pixels". "Grouping", on the other hand, may refer to "region", "area", "distribution" and/or "grouping of interest", whereas "adjoining pixels" may refer to "adjacent pixels". Moreover, the phrase "not comprised in the one or more detected human beings" may refer to "not comprised in the one or more detected objects classified as human beings", "not comprising pixels of the one or more detected human beings" and/or "excluding the detected human beings". "Predeterminable intensity range", on the other hand, may refer to "predeterminable intensity range corresponding to, and/or synonym with, human—and/or human head—intensities and/or heat signatures" and/or merely "human head intensity range".

The people distinguishing system 1 is further—e.g. by means of an area determining unit 103 (shown and further described in FIG. 3)—adapted and/or configured for determining a grouping pixel area 40 of the at least first grouping 4 in the image 3. Thereby, there is established an area distribution 40—in exemplifying FIG. 1 depicted as the contour—of the adjoining pixels 4 identified to be within the predeterminable range.

Determining the grouping pixel area 40 may be accomplished in any arbitrary—e.g. known—manner, such as with support from computer vision techniques and/or image processing. Moreover, the grouping pixel area 40 of adjoining pixels may be of any arbitrary—e.g. irregular—shape and/or form, naturally depending on people and/or number of people—or potential other objects having intensities within the predeterminable intensity range—in the scene. The phrase "determining the grouping pixel area" may refer to "calculating and/or estimating the grouping pixel area", whereas "pixel area", on the other hand, may refer to "pixel area distribution".

The people distinguishing system 1 is moreover—e.g. by means of an expected area determining unit 104 (shown and further described in FIG. 3)—adapted and/or configured for determining for at least a first vertical position $y_{expected}$ in the image 3, based on head size reference data 5, an expected pixel area $x_{expected}$ of a human head at the at least first vertical position $y_{expected}$. Thereby, by confronting head size reference data 5, there is established respective expected pixel area x form and size of a human head for one or more vertical positons y in the image 3. That is, an exemplifying low value vertical position y may be indicative of nearness to the thermal camera 10 as compared to an exemplifying higher value vertical positon y, whereby a pixel area x of a human head at the exemplifying low value vertical position y may be expected to be of greater size than for the exemplifying higher value vertical position y. Accordingly, the head size reference data 5 comprises a mapping between one or more vertical positions y and corresponding expected size and form of a human head in terms of expected pixel area x for respective one or more vertical positions y, thus enabling for determining a respective expected head size $x_{expected}$ at a respective vertical position $y_{expected}$.

The at least firsts vertical position $y_{expected}$ may be represented by any arbitrary vertical position(s) y in the image 3. Moreover, the head size reference data 5 may be represented by any data indicative of a relationship between vertical positions y in the image 3 and corresponding expected pixel area x or a human head. The head size reference data 5 may for instance be comprised in a data table, further for instance be stored in the people distinguishing system 1, in the thermal camera 10, on a remote server etc., and moreover for instance be pre-stored.

The phrase "determining an expected pixel area" may refer to "deriving, obtaining, calculating and/or interpolating an expected pixel area", whereas "determining based on head size reference data" may refer to "determining by confronting head size reference data" and/or "determining from data indicative of a relationship between vertical positions in said image and corresponding expected pixel area of a human head". Moreover, the phrase "head size reference data" may refer to "head pixel area reference data" and/or "head size mapping data", whereas "data" may refer to "mapping information". "Expected" pixel area, on the other hand, may refer to "expected corresponding" pixel area and/or "estimated and/or calculated" pixel area.

Optionally, as exemplified in FIG. 1, the head size reference data 5 may be based on mapping—for two 21, 22 or more of the detected human beings 2—a respective vertical position $y_1$, $y_2$ and pixel area $x_1$, $x_2$ of a head 212, 222 of the detected human being 21, 22 in the image 3. Further optionally, the head size reference data 5 may be based on interpolation from said mapping. Thereby, a first determined head size pixel area $x_1$ of a head 212 of a detected human being 21 at a first determined vertical position $y_1$ and at least a second determined head size pixel area $x_2$ of a head 222 of a detected human being 22 at a second determined vertical position $y_2$, may form basis for the head size reference data 5. The head size reference data 5 may for instance, as depicted in an exemplifying coordinate plane in exemplifying FIG. 1, rely on a linear graph 50—or an essentially linear graph—between the first head size pixel area $x_1$/first vertical position $y_1$ and the at least second head size pixel area $x_2$/second vertical position $y_2$. The mapped vertical position $y_1$, $y_2$ of the detected human beings 21, 22 may be selected along a respective extension i.e. height of said detected human beings 21, 22 as deemed suitable, for instance—as exemplified din FIG. 1—at a lower end of respective head 212, 222, alternatively for instance at an upper end—or assumed eye level—of respective head 212, 222. Moreover, "mapping" may refer to "associating" and/or "connecting", whereas "based on mapping" may refer to "calculated and/or derived from a mapping of". "Vertical position and pixel area", on the other hand, may refer to "vertical head position and vertical head size pixel area".

As exemplified in FIG. 2, the people distinguishing system 1 is furthermore—e.g. by means of a comparing unit 105 (shown and further described in FIG. 3)—adapted and/or configured for comparing at least a portion of the grouping pixel area 40 with the expected head pixel area $x_{expected}$ for the at least first vertical position $y_{expected}$. Thereby, selected regions of pixels of the grouping pixel area 40 are compared with respective expected pixel area(s) $x_{expected}$ of human heads for one or more vertical positions $y_{expected}$.

The comparing of pixel areas may be repeated for any arbitrary number of vertical positions y. Moreover, the comparing activities may be accomplished in any arbitrary—e.g. known—manner, such as with support from computer vision techniques and/or image processing. The at least portion of the grouping pixel area 40, on the other hand, may be represented by any region of the grouping pixel area 40 and may further be of arbitrary size, form and/or shape deemed suitable and/or feasible. For instance, one or more regions of the grouping pixel area 40 to at least some extent—or to a predeterminable extent—resembling a human head, may be selected for comparison. The phrase "comparing at least a portion" may refer to "comparing at least a region" and/or "comparing one or more selected regions", whereas "expected head pixel area" may refer to "expected head size pixel area" and/or "expected pixel area of a human head".

The people distinguishing system 1 is moreover—e.g. by means of a conformity determining unit 106 (shown and further described in FIG. 3)—adapted and/or configured for determining that the at least first grouping 4 comprises at least a first overlapping human being 6, when at least a first comparison resulting from said comparing exceeds a predeterminable conformity threshold. Thereby, it may be established, provided that the comparing activities lead to one or more exceedances of a threshold setting a level for minimum conformity between a region of the grouping pixel area 40—such as a region at least partly resembling a human head—and an expected head size x, that the at least first grouping 4 in the image 3 comprises one or more overlapping human being 6.

Accordingly, people not distinguishable in a crowded image 3 by means of e.g. commonly known object detection—and/or with difficulty distinguishable—may be distinguishable with the introduced concept.

In exemplifying FIG. 2, it may be determined that the conformity threshold is exceeded at exemplifying three occasions out of potentially numerous comparisons; for one comparison of a region resembling a head—of what subsequently may be identified as a first overlapping human being 61—with an expected head size pixel area $x_{expected}$ at a first vertical position $y_{expected}$, and in a similar manner, for a respective second and third comparison of respective regions resembling heads—of what subsequently may be identified as a second overlapping human being 62 and a third overlapping human being 63—with respective expected head size pixel area x at respective second and third vertical positions y.

The predeterminable conformity threshold may be set to any value deemed suitable and/or feasible, and for instance indicate a level, degree and/or percentage of matching between a region of the grouping pixel area 40 and an expected head size x, needed to be exceeded in order for the at least first grouping 4 to be considered comprising overlapping human being(s) 6. The conformity threshold may accordingly for instance be represented by a match of for instance at least 50 percent, at least 70 percent or at least 90 percent. The phrase "determining that said at least firsts grouping comprises" may refer to "estimating and/or concluding that said at least first grouping comprises", whereas "overlapping human being" may refer to "at least partly overlapping human being" and/or "in said image overlapping human being". "When", on the other hand, may refer to "should" and/or "provided that", whereas "comparison" may refer to "comparing activity". Moreover, the phrase "predeterminable conformity threshold" may refer to "predeterminable resemblance threshold", "predeterminable head match threshold" and/or merely "conformity threshold".

Optionally, the people distinguishing system 1 may—e.g. by means of an optional number estimating unit 107 (shown and further described in FIG. 3)—be adapted and/or configured for estimating a number of overlapping human beings 6 in the at least first grouping 4 based on number of comparisons exceeding the conformity threshold. Thereby, by counting each time the conformity threshold is exceeded—which may be equated with how many overlapping human beings 6 is determined to be comprised in the at least first grouping 4—a number of overlapping human beings 6 in the at least first grouping 4 may be estimated. In exemplifying FIG. 2, three overlapping human beings 61, 62, 63 are depicted in an exemplifying manner. The phrase "estimating a number" may refer to "determining a number" and/or "calculating a number", whereas "based on number of comparisons exceeding said conformity threshold" may refer to "by counting number of comparisons exceeding said conformity threshold".

Further optionally, the people distinguishing system 1 may—e.g. by means of an optional total number estimating unit 108 (shown and further described in FIG. 3)—be adapted and/or configured for estimating a total number of people in the image 3 by adding the number of overlapping human beings 6 to the one or more detected human beings 2. Thereby, an approach is provided supporting estimating total number of people in a crowded image 3. In exemplifying FIGS. 1-2, two detected human beings 21, 22 along with three overlapping human beings 61, 62, 63 are depicted in an exemplifying manner, thus adding up to an exemplifying total number of five people. The phrase "estimating a total number" may refer to "determining a total number" and/or "calculating a total number".

As further shown in FIG. 3, which is a schematic block diagram illustrating an exemplifying people distinguishing system 1 according to embodiments of the disclosure, the people distinguishing system 1 may comprise a human identifying unit 101, a grouping identifying unit 102, an area determining unit 103, an expected area determining unit 104, a comparing unit 105, a conformity determining unit 106, an optional number estimating unit 107 an/or an optional total number estimating unit 108, all of which already have been described in greater detail above. Furthermore, the embodiments herein for distinguishing—in an image 3—human beings in a crowd, may be implemented through one or more processors, such as a processor 109, here denoted CPU, together with computer program code for performing the functions and actions of the embodiments herein. Said program code may also be provided as a computer program product, for instance in the form of a data carrier carrying computer program code for performing the embodiments herein when being loaded into the people distinguishing system 1. One such carrier may be in the form of a CD ROM disc and/or a hard drive, it is however feasible with other data carriers. The computer program code may furthermore be provided as pure program code on a server and downloaded to the people distinguishing system 1. The people distinguishing system 1 may further comprise a memory 110 comprising one or more memory units. The memory 110 may be arranged to be used to store e.g. information, and further to store data, configurations, schedulings, and applications, to perform the methods herein when being executed in the people distinguishing system 1. For instance, the computer program code may be implemented in the firmware, stored in FLASH memory 110, of an embedded processor 109, and/or downloaded wirelessly e.g. from an off-board server. Furthermore, said units 101-108, the optional processor 109 and/or the optional memory 110 may at least partly be comprised in, associated with and/or be connected to the thermal camera 10 and/or for instance a surveillance system optionally comprising said thermal camera 10. Those skilled in the art will also appreciate that said units 101-108 described above may refer to a combination of analog and digital circuits, and/or one or more processors configured with software and/or firmware, e.g. stored in a memory such as the memory 110, that when executed by the one or more processors such as the processor 109 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, Soc.

Figure 4:
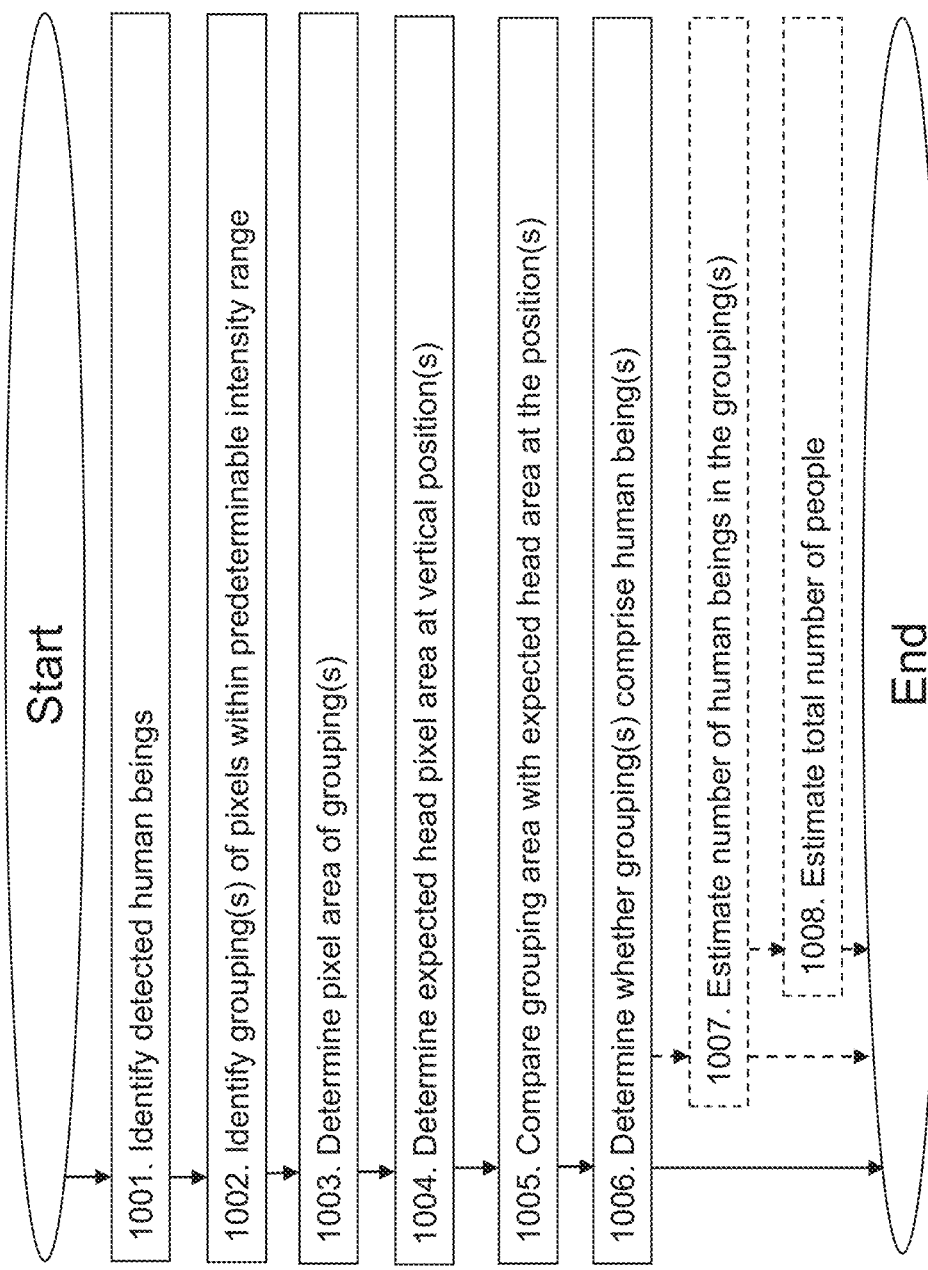
FIG. 4 is a flowchart depicting an exemplifying method performed by a people distinguishing system according to embodiments of the disclosure.

FIG. 4 is a flowchart depicting an exemplifying method performed by a people distinguishing system 1 according to embodiments of the disclosure. Said method is for in an image distinguishing human beings in a crowd. The exemplifying method, which may be continuously repeated, comprises one or more of the following actions discussed with support from FIGS. 1-3. Moreover, the actions may be taken in any suitable order and/or one or more actions may be performed simultaneously and/or in alternate order where applicable. For instance, Action 1004 may be performed simultaneously with and/or prior to Action 1002 and/or Action 1003.

Action 1001

In Action 1001, the people distinguishing system 1 identifies—e.g. with support from the human identifying unit 101—one or more detected objects classified as human beings 2 in an image 3 derived from a thermal camera 10 adapted to capture a scene in an essentially forward-looking angle.

Action 1002

In Action 1002, the people distinguishing system 1 identifies—e.g. with support from the grouping identifying unit 102—at least a first grouping 4 of adjoining pixels in the image 3, not comprised in the one or more detected human beings 2, having an intensity within an predeterminable intensity range.

Action 1003

In Action 1003, the people distinguishing system 1 determines—e.g. with support from the area determining unit 103—a grouping pixel area 40 of the at least first grouping 4 in the image 3.

Action 1004

In Action 1004, the people distinguishing system 1 determines—e.g. with support from the expected area determining unit 104—for at least a first vertical position $y_{expected}$ in the image 3, based on head size reference data 5, an expected pixel area $x_{expected}$ of a human head at the at least first vertical position $y_{expected}$.

Action 1005

In Action 1005, the people distinguishing system 1 compares—e.g. with support from the comparing unit 105—at least a portion of the grouping pixel area 40 with the expected head pixel area $x_{expected}$ for the at least first vertical position $y_{expected}$.

Action 1006

In Action 1006, the people distinguishing system 1 determines—e.g. with support from the conformity determining unit 106—that the at least first grouping 4 comprises at least a first overlapping human being 6, when at least a first comparison resulting from the comparing of Action 1005 exceeds a predeterminable conformity threshold.

Action 1007

In optional Action 1007, the people distinguishing system 1 may estimate—e.g. with support from the optional number estimating unit 107—a number of overlapping human beings 6 in the at least first grouping 4 based on number of comparisons exceeding the conformity threshold.

Action 1008

In optional Action 1008, the people distinguishing system 1 may estimate—e.g. with support from the optional total number estimating unit 108—a total number of people in the image 3 by adding the overlapping number of human beings 6 to the one or more detected human beings 2.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a people distinguishing system for in an image distinguishing human beings in a crowd, said method comprising:
   identifying by detecting and classifying objects, one or more detected objects classified as human beings in an image derived from a thermal camera adapted to capture a scene in a forward-looking angle considered eye level of people or from slightly there above;
   identifying at least a first grouping of adjoining pixels in said image, not comprised in the one or more detected human beings, having an intensity within a predeterminable intensity range;
   determining a grouping pixel area of said at least first grouping in said image by a computer vision technique that identifies a condition in which the grouping pixel area of said at least first grouping in said image is within the predeterminable intensity range;
   determining for at least a first vertical position ($y_{expected}$) of said grouping pixel area in said image, based on head size reference data, an expected pixel area ($x_{expected}$) size and form of a human head at said at least first vertical position ($y_{expected}$), wherein said head size reference data is represented by data indicative of a relationship between vertical positions (y) in the image and corresponding expected pixel area ($x_{expected}$) i.e. size and form of a human head;
   comparing at least a portion resembling a human head of said grouping pixel area with said expected head pixel area ($x_{expected}$) for said at least first vertical position ($y_{expected}$); and
   determining that said at least first grouping comprises at least a first overlapping human being, when at least a first comparison resulting from said comparing exceeds a predeterminable conformity threshold.

2. The method according to claim 1, further comprising:
   estimating a number of overlapping human beings in said at least first grouping based on number of comparisons exceeding said conformity threshold.

3. The method according to claim 2, further comprising:
   estimating a total number of people in said image by adding said overlapping number of human beings to the one or more detected human beings.

4. The method according to claim 1, wherein said identifying at least a first grouping comprises said intensity range being based on an intensity measure of at least one of the one or more detected human beings.

5. The method according to claim 1, wherein said head size reference data is based on mapping, for two or more of the detected human beings, a respective vertical position ($y_1$, $y_2$) and pixel area ($x_1$, $x_2$) of a head of the detected human being in said image.

6. The method according to claim 5, wherein said head size reference data is based on interpolation from said mapping.

7. A people distinguishing system for distinguishing human beings in a crowd shown in an image, said people distinguishing system comprising:
   a human identifying unit for identifying by detecting and classifying objects, one or more detected objects classified as human beings in an image derived from a thermal camera adapted to capture a scene in a forward-looking angle considered eye level of people or from slightly there above;
   a grouping identifying unit for identifying at least a first grouping of adjoining pixels in said image, not comprised in the one or more detected human beings, having an intensity within an predeterminable intensity range;
   an area determining unit adapted for determining a grouping pixel area of said at least first grouping in said image by a computer vision technique that identifies a condition in which the grouping pixel area of said at least first grouping in said image is within the predeterminable intensity range;
   an expected area determining unit for determining for at least a first vertical position ($y_{expected}$) of said grouping pixel area in said image, based on head size reference data, an expected pixel area ($x_{expected}$) size and form of a human head at said at least first vertical position ($y_{expected}$), wherein said head size reference data is represented by data indicative of a relationship between vertical positions (y) in the image and corresponding expected pixel area ($x_{expected}$) i.e. size and form of a human head;

a comparing unit for comparing at least a portion resembling a human head of said grouping pixel area with said expected head pixel area ($x_{expected}$) for said at least first vertical position ($y_{expected}$); and a conformity determining unit for determining that said at least first grouping comprises at least a first overlapping human being, when at least a first comparison resulting from said comparing exceeds a predeterminable conformity threshold.

8. The people distinguishing system according to claim 7, further comprising:
   a number estimating unit for estimating a number of overlapping human beings in said at least first grouping based on number of comparisons exceeding said conformity threshold.

9. The people distinguishing system according to claim 7, further comprising:
   a total number estimating unit for estimating a total number of people in said image by adding said overlapping number of human beings to the one or more detected human beings.

10. The people distinguishing system according to claim 7, wherein said grouping identifying unit is adapted for said intensity range being based on an intensity measure of at least one of the one or more detected human beings.

11. The people distinguishing system according to claim 7, wherein said head size reference data is based on mapping, for two or more of the detected human beings, a respective vertical position ($y_1$, $y_2$) and pixel area ($x_1$, $x_2$) of a head of the detected human being in said image.

12. The people distinguishing system according to claim 11, wherein said head size reference data is based on interpolation from said mapping.

13. A thermal camera comprising the people distinguishing system according to claim 7.

14. A non-transitory computer program product comprising a memory that stores a computer program containing computer program code arranged to cause a computer or a processor to execute the steps of the method according to claim 1.

15. The non-transitory computer program product of claim 14, wherein the memory is a non-volatile memory.

16. A people distinguishing system for distinguishing human beings in a crowd shown in an image, said people distinguishing system comprising:
   circuitry configured to
      identify via by detection and classification of objects, one or more detected objects classified as human beings in the image derived from a thermal camera adapted to capture a scene in a forward-looking angle considered eye level of people or from slightly there above;
      identify at least a first grouping of adjoining pixels in said image, not comprised in the one or more detected human beings, having an intensity within a predeterminable intensity range;
      determine a grouping pixel area of said at least first grouping in said image by a computer vision technique that identifies a condition in which the grouping pixel area of said at least first grouping in said image is within the predeterminable intensity range;
      determine for at least a first vertical position ($y_{expected}$) of said grouping pixel area in said image, based on head size reference data, an expected pixel area ($x_{expected}$) size and form of a human head at said at least first vertical position ($y_{expected}$), wherein said head size reference data is represented by data indicative of a relationship between vertical positions (y) in the image and corresponding expected pixel area ($x_{expected}$) i.e. size and form of a human head;
      compare at least a portion resembling to at least some extent a human head of said grouping pixel area with said expected head pixel area ($x_{expected}$) for said at least first vertical position ($y_{expected}$); and
      determine that said at least first grouping comprises at least a first overlapping human being, under a condition that at least a first comparison resulting from the comparison exceeds a predeterminable conformity threshold.

* * * * *